United States Patent
Doany et al.

(10) Patent No.: US 9,735,879 B2
(45) Date of Patent: Aug. 15, 2017

(54) NEAR-THRESHOLD OPTICAL TRANSMITTER PRE-DISTORTION

(71) Applicant: INTERNATIONAL BUSINESS MACHINES CORPORATION, Armonk, NY (US)

(72) Inventors: Fuad E. Doany, New York, NY (US); Daniel M. Kuchta, Patterson, NY (US); Jonathan E. Proesel, Mount Vernon, NY (US); Alexander V. Rylyakov, Mount Kisco, NY (US); Clint L. Schow, Ossining, NY (US); Marc A. Taubenblatt, Pleasantville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 14/502,734

(22) Filed: Sep. 30, 2014

(65) Prior Publication Data

US 2016/0094295 A1 Mar. 31, 2016

(51) Int. Cl.
| | | |
|---|---|---|
| H04B 10/04 | (2006.01) | |
| H04B 10/508 | (2013.01) | |
| H04B 10/58 | (2013.01) | |
| H04B 10/2507 | (2013.01) | |
| H04B 10/50 | (2013.01) | |

(52) U.S. Cl.
CPC ....... *H04B 10/508* (2013.01); *H04B 10/2507* (2013.01); *H04B 10/504* (2013.01); *H04B 10/58* (2013.01); *H04B 10/50572* (2013.01)

(58) Field of Classification Search
None
See application file for complete search history.

(56) References Cited

U.S. PATENT DOCUMENTS

| | | | |
|---|---|---|---|
| 6,873,632 B2 | 3/2005 | Hsieh | |
| 7,173,551 B2* | 2/2007 | Vrazel | G11C 27/02 341/144 |
| 7,274,747 B1* | 9/2007 | Lobo | 375/146 |
| 7,501,294 B1 | 3/2009 | Nakagawa | |
| 7,630,422 B1 | 12/2009 | Ziazadeh et al. | |
| 8,228,962 B2 | 7/2012 | Mortensen et al. | |
| 9,331,788 B2* | 5/2016 | Abe | H04B 10/50 |
| 2004/0223768 A1* | 11/2004 | Shastri | G02F 1/0121 398/183 |

(Continued)

OTHER PUBLICATIONS

Krehlik et al., Laser driver with subthreshold laser bias and turn-on-delay compensation by prejittering of the modulating current, 2005, Elsevier GmbH, pp. 331-337.*

(Continued)

*Primary Examiner* — Ken N Vanderpuye
*Assistant Examiner* — Jai Lee
(74) *Attorney, Agent, or Firm* — Tutunjian & Bitetto, P.C.; Daniel P. Morris (57) ABSTRACT

Methods an systems for low-power transmission include biasing an emitter in a non-linear operating range of the emitter near a threshold current of the emitter. A data signal is distorted to add a precursor pulse to a rising edge of a data waveform to quickly bring the emitter into a linear operating range. The distorted data signal is transmitted at the emitter.

20 Claims, 8 Drawing Sheets

(56) References Cited

U.S. PATENT DOCUMENTS

| | | | | |
|---|---|---|---|---|
| 2005/0041984 | A1* | 2/2005 | Chandler | H04B 10/50593 398/189 |
| 2008/0050125 | A1* | 2/2008 | Essiambre | H04B 10/25133 398/193 |
| 2010/0008662 | A1 | 1/2010 | Bradbeer | |
| 2010/0303472 | A1* | 12/2010 | Miller | H01S 5/06832 398/195 |
| 2011/0020006 | A1 | 1/2011 | Christensen | |
| 2011/0149385 | A1 | 6/2011 | Bagheri et al. | |
| 2012/0045217 | A1* | 2/2012 | Tsunoda | H03K 5/1565 398/182 |
| 2012/0045223 | A1* | 2/2012 | Oku | H04B 10/504 398/201 |
| 2012/0163407 | A1 | 6/2012 | Yang et al. | |
| 2012/0213243 | A1 | 8/2012 | Johnson et al. | |
| 2012/0224849 | A1* | 9/2012 | Rylyakov | H04B 10/2507 398/27 |

OTHER PUBLICATIONS

Schnitzer et al., Bias-free 2.5Gbit/s data transmission using polyimide passivated GaAs VCSELs, 1998, Electronics Letters, vol. 34, No. 6, pp. 573-575.*

Mehdi, Von Neumann Architecture, http://www2.cs.siu.edu/~cs401/Textbook/ch2.pdf, Jan. 19, 2012, pp. 1-2.*

Sturnus, Introduction to Look-up tables, 2010, http://www.sturnus.co.uk/performance/2010-09/introduction-to-lookup-tables.*

Krehlik et al., Laser driver with subthreshold laser bias and turn-on-delay compensation by prejittering of the modulating current, 2006, Elsevier GmbH, pp. 331-337.*

Dokhane et al., "Faster Modulation of Single-Mode Semiconductor Lasers Through Patterned Current Switching: Numerical Investigation", IEE Proc.-Optoelectron., vol. 151, No. 2, Apr. 2004, pp. 61-68.

Illing et al., "Shaping Current Waveforms for Direct Modulation of Semiconductor Lasers", IEEE Journal of Quantum Electronics, vol. 40, No. 5., May 2004, pp. 445-452.

Schow et al., "Transmitter Pre-Distortion for Simultaneous Improvements in Bi-Rate, Sensitivity, Jitter, and Power Efficiency in 20 Gb/s CMOS-driven VCSEL Links", OFC/NFOEC Conf., Mar. 2011. (3 pages).

Sedighi et al., "40 Gb/s VCSEL Driver IC With a New Output Current and Pre-Emphasis Adjustment Method", MTT-S IEEE Inter. Conf., Jun. 2012. (3 pages).

Zei et al., "Operation Range of VCSEL-Interconnect Links With "Below-Threshold"-Biasing", Journal of Lightware Technology, vol. 18, Issue 4, Apr. 2000, pp. 477-481.

* cited by examiner

NEAR-THRESHOLD OPTICAL TRANSMITTER PRE-DISTORTION

BACKGROUND

Technical Field

The present invention relates to optical communications and, more particularly, to transmitter pre-distortion in optical transmitters using semiconductor lasers.

Description of the Related Art

Short-reach interconnects using multi-mode optical fiber (MMF), over distances on the order of 100 m, are widely used in computer systems, data centers, and campus networks. For these data links, the optical channel contributes relatively little signal degradation for 10-40 Gb/s data rates. In addition, generations of fiber with optimized modal bandwidth continue to be developed that minimize the optical channel as the primary source of signal degradation. The biggest challenge for short-reach interconnects is to produce active components, namely optical transmitters and receivers, that provide sufficient bandwidth to operate at high data rates (e.g., >25 Gb/s) while maintaining low power consumption to maximize the power efficiency (commonly expressed in mW/Gb/s or pJ/bit: the energy required to transmit a bit of information).

One conventional approach to implementing an optical link is to separate the transmitter and receiver, designing each separately. The transmitter is optimized to make its digital optical output as ideal as possible, while the receiver is designed to receive the transmitted optical signal and convert the optical signal to an electrical signal with high sensitivity (i.e., to operate with as little optical power as possible at a given bit-rate) with minimum added jitter. Both transmitter (TX) and receiver (RX) are designed to meet specifications while consuming a minimum amount of power. The most straightforward method for building optical TXs and RXs is to use high-speed analog drivers and receiver amplifiers that have sufficient bandwidth to faithfully convert the electrical signal to an optical signal and back again with minimal distortion. However, as data rates have increased beyond 10 Gb/s, it is difficult to realize optical devices (lasers and detectors) and amplifier circuits that have sufficient raw bandwidth with acceptable power consumption. To achieve the highest data rates, the lasers are operated at high current densities and the circuits typically consume large amounts of electrical power to deliver high speed performance.

SUMMARY

A method for low-power transmission includes biasing an emitter in a non-linear operating range of the emitter near a threshold current of the emitter. A data signal is distorted to add a precursor pulse to a rising edge of a data waveform to quickly bring the emitter into a linear operating range. The distorted data signal is transmitted at the emitter.

A method for low-power transmission includes applying a biasing current to a semiconductor laser that is at or below a threshold current of the laser. A data signal is distorted to add a precursor pulse to a rising edge of a data waveform to quickly bring the emitter into a linear operating range. Distorting the data signal includes obtaining a pre-cursor pulse sequence that corresponds to a bit sequence carried by the data signal, said pre-cursor pulse having an amplitude that is responsive to preceding bits. The distorted data signal is transmitted at the emitter.

A transmitter includes an emitter having a threshold current and a pre-distortion equalization controller. The emitter is configured to transmit a pre-distorted data signal, wherein the emitter is biased in a non-linear operating range near the threshold current. The pre-distortion equalization controller is configured to distort a data signal to add a precursor pulse to a rising edge of a data waveform to quickly bring the emitter into a linear operating range.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention lower the power dissipation of emitters, such as vertical-cavity surface-emitting lasers (VCSELs), that run optical links by biasing the VCSEL close to (or below) the emitter's threshold current. This allows the VCSEL to be used with a lower power consumption, but results in turn-on jitter. The present embodiments therefore employ pre-distortion (otherwise known as pre-emphasis and feed-forward) transmitter equalization to compensate for the resulting inter-symbol interference and turn-on delay distortion. The pre-distortion is optimized for the entire end-to-end link, rather than simply optimizing the waveform of the VCSEL output signal. Although the present embodiments are set forth with a specific focus on VCSELs, it should be understood that the present principles may be applied to any optical link based on semiconductor lasers, e.g., edge emitting semiconductor lasers.

The present principles apply equalization to overcome the limited performance of optical components and the circuits that make up the optical link, rather than to overcome signal impairments that arise due to transmission over a fiber. Equalization has been demonstrated to compensate for signal distortion that arises from fiber bandwidth limitations and is widely used in long-distance optical communication systems in the form of fiber dispersion compensators. In contrast, the present embodiments apply equalization as a pre-emphasis, even when such pre-emphasis causes visible distortion in the transmitter output. In other words, rather than attempting to create a "perfect" VCSEL output, the pre-emphasis employed in the present embodiments produces a waveform that accounts for distortions across the entire link. The transmitter converts the pre-emphasized/distorted signal into a pre-emphasized/distorted optical signal but, when the signal is received at a bandwidth-limited receiver, the data recovered by the receiver is dramatically improved.

Figure 1:
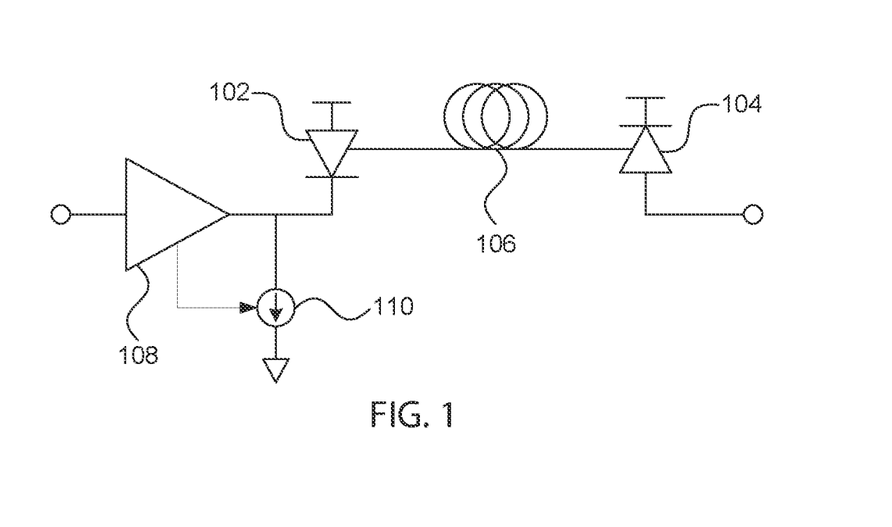
FIG. 1 is a diagram of an optical communications system in accordance with the present principles.

Referring now to the drawings in which like numerals represent the same or similar elements and initially to FIG. 1, an optical link 100 is shown. A laser 102, in the present embodiments described as a VCSEL, emits light across a medium 106, such as an optical fiber, and the light is received by a photodiode 104 before processing by receiver circuitry (not shown). In a threshold-based device, such as a VCSEL, the emitting behavior is highly non-linear near the threshold current—this non-linearity causes jitter in the signal on its rising edge only. The emitter 102 is biased with a bias current 110. A drive current is supplied by a driver 108 with pre-distortion equalization. It should be noted that, although FIG. 1 is depicted with a common anode driving configuration, the present principles apply to a common cathode driving configurations as well, where the VCSEL 102 and bias drive current 110 swap positions in the schematic.

In conventional optical connections, the bias current biases the laser above the threshold current, keeping the laser in a range of linear operation. While this allows the laser to turn on immediately when a drive current is applied, a substantial amount of power is wasted when the laser is off. For example, biasing a laser in a conventional network above the threshold current can continuously waste several milliamps. With a power supply of 4-5V this can produce an additional power dissipation of 10 mW, resulting in a cost of more than one picojoule per bit at 10 Gb/s speeds.

The present embodiments therefore keep the bias current 110 below the threshold current of the laser 102. This provides a substantial reduction in power consumption, but can cause a lag in the switch-on time of the laser 102 as the drive current needs to ramp up above the threshold. If the bias current 110 is significantly less than the threshold current of the laser 102, the time delay can be larger than the bit period and an entire logic bit can go missing from the bit stream. The time delay $\tau_d$ for turning on the emitter 102 can be modeled as:

$$\tau_d = \tau_{th} \ln\left(\frac{I_p}{I_p + I_b - I_{th}}\right),$$

where $\tau_{th}$ is the carrier (electron) lifetime at threshold, $I_p$ is the drive current, $I_b$ is the bias current, and $I_{th}$ is the threshold current. As can be seen, the delay time can be minimized by increasing the drive current and/or the bias current. Rather than just use a constant bias current and driving the laser 102 with a high drive current, the present embodiments keep the currents low and accounts for the increased delay in other ways.

In particular, the bias current 110 need not be a constant current, but may be controlled by the driver 108 by dynamically adjusting equalization settings at the driver 108. In data transmission there are stages where the data is in a high speed serial format such as on the optical link and other stages (e.g., before the transmitter and after the receiver). Outside of these stages, the data is deserialized and propagated in a lower-speed parallel "word" or "frame." For example, a 56 Gb/s serial optical link may have an electrical interface that has four electrical data inputs at 14 Gb/s. In the present embodiments, data is observed before it reaches the laser and the bias and/or drive levels are adjusted accordingly to optimize the transmission of the signal. It is possible to observe data when in the high-speed serial state, but observation at this stage is difficult and involves high-speed circuitry. Such high-speed circuits often consume significant amounts of power that may exceed the benefits of reducing power consumption from the invention. An alternative is to monitor the incoming data while in its parallel format using slower circuits or even a lookup table. In addition, by observing incoming data before it is serialized into high-speed data, more time is made available to make a decision as to how to adjust the bias and pre-cursor.

It should be noted that semiconductor laser speed and reliability are often inversely related. The bandwidth of a semiconductor laser increases as its bias current increase, but the lifetime of the laser is reduced. By allowing such lasers to operate at high speeds with low bias currents, the present embodiments improve the expected lifetime of the laser 102.

The driver 108 pre-distorts the optical output of the laser 102 so that, when the optical signal is received by photodetector 104 and converted into an electrical signal, the overall link performance is improved. Link improvement may be quantified through multiple parameters, including data rate capability, power efficiency, sensitivity, link margin, timing margin improvement, and reduced jitter. The present embodiments seek to lower power dissipation while keeping the other parameters within design specifications.

Figure 2:
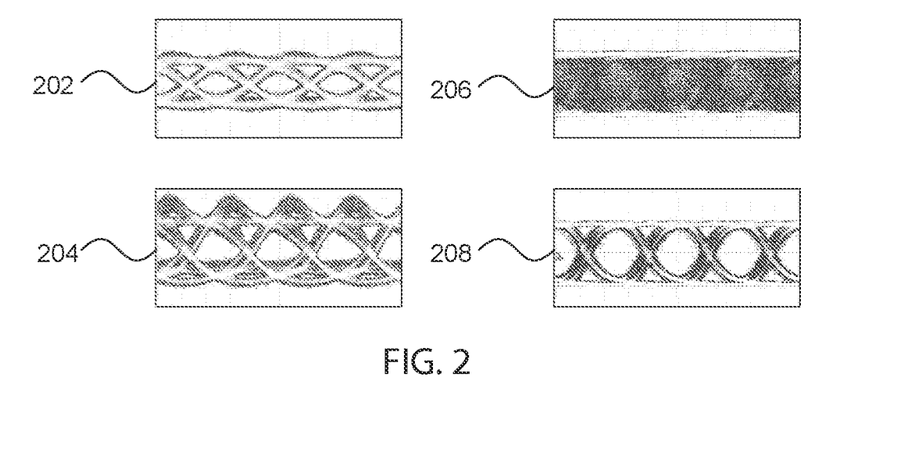
FIG. 2 is a set of eye diagrams illustrating the efficacy of pre-distortion in accordance with the present principles.

Referring now to FIG. 2, a comparison of different signals is shown at different points in the signal path. The signals are shown in "eye diagrams" that are an overlay in time of many sampled or captured waveforms. Signals 202 and 204 represent the signals at the output of the laser 102, with 202 representing a signal that has been optimized for the transmitter's waveform at this stage, whereas 204 represents a signal that has been pre-distorted and optimized for complete-link performance. Block 206 shows the output signal after the signal is processed by a receiver, which does not have sufficient bandwidth for this data rate—substantial noise has accumulated and the signal is difficult to recover. In contrast, 208 shows that the output of the pre-distorted signal at the same receiver is very clean.

These diagrams show the difference between the conventional signal modulation and the pre-distorted signals of the present embodiments. Conventional optical links are designed such that the transmitter optical output is as clean as possible, meaning that the logical 1/0 transitions are as fast as possible, that the 1 and 0 levels are uniform, with minimal overshoot and undershoot, and that jitter is as low as possible. All of these goals are captured in viewing an eye diagram. The eye diagrams discussed above show that when the transmitter-optimized signal 202 is received, the eye diagram of the electrical output 206 is completely closed—almost none of the bits are successfully transferred through the optical link. In contrast, the pre-distorted signal 204 shows significant over- and undershoot, as well as jitter. The received signal produces an open eye diagram 208, indicating that the bits of information are being successfully transferred.

Figure 3:
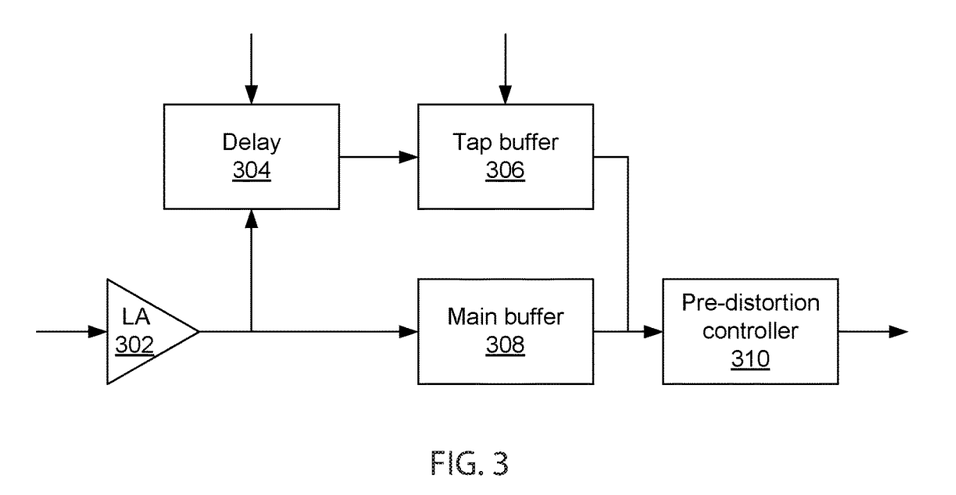
FIG. 3 is a diagram showing equalization in accordance with the present principles.

Referring now to FIG. 3, an embodiment of the driver 108 is shown. In this case, the driver 108 is implemented as a feed-forward equalizer (FFE) amplifier. The FFE amplifier includes a linear amplifier 302 that accepts the input signal. The output of the linear amplifier is split into two branches—one that goes to a main buffer 308 and one that goes to a tap. The tap line includes a programmable delay 304 that delays the signal according to a delay control and a tap buffer that controls the strength of the fed-forward portion of the signal according to a tap control. A pre-distortion equalization controller 310 adds a pre-cursor signal to the leading edge of the waveform only to compensate for turn-on jitter. The combination of the signals dictates the shape and the amount of pre-distortion and may be continuously variable, ranging from zero distortion to a maximum distortion. These control values can be determined in one of several different ways. A nominal set of values may be established during final test in manufacturing, based on the particular properties of the laser in that module. These nominal values are then adjusted in the field to account for the optical channel or environment if it is less than ideal or nominal. The specific amplitude and timing of the distortion waveforms will depend on the laser, the channel, and the receiver.

Figure 4:
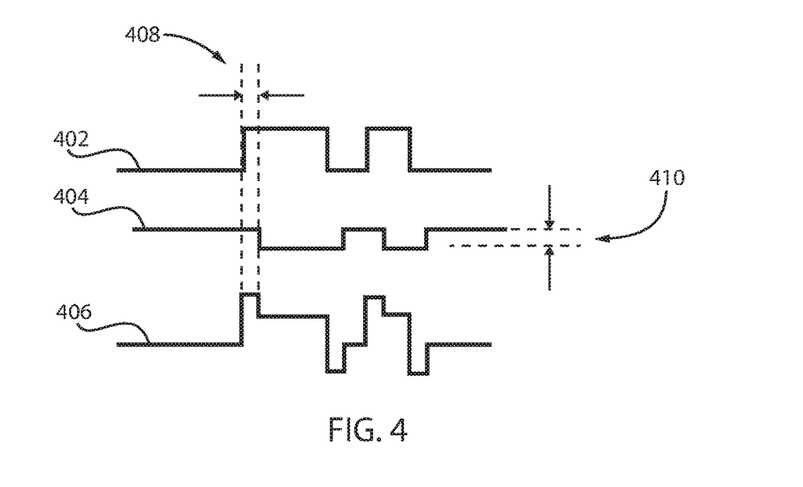
FIG. 4 is a diagram showing the combination of a signal with a delayed tap in accordance with the present principles.

Referring now to FIG. 4, a set of signals is shown. The first signal, 402, represents the main buffer output. The second signal, 404, shows the output of the tap buffer 306, having had its timing and amplitude and polarity changed. When the output of the tap buffer 306 is combined with the output of the main buffer 308, the output of the driver 308 is distorted according to the sum of the signals, shown as 406. The tap buffer output signal 404 is delayed relative to the main signal by a delay 408, determined by the input to the programmable/adjustable delay module 304 and the amplitude of the signal 410 is determined by the input to the tap buffer 306. It should be noted that these signals show a higher amplitude at the leading edge of each waveform. This increased amplitude helps to minimize turn-on delay in the laser. It should be noted that this form of equalization is insufficient to overcome all of the turn-on delay jitter. The pre-distortion equalization controller 310 adds an additional pulse to the leading edge of the waveform as described in greater detail below.

Figure 5:
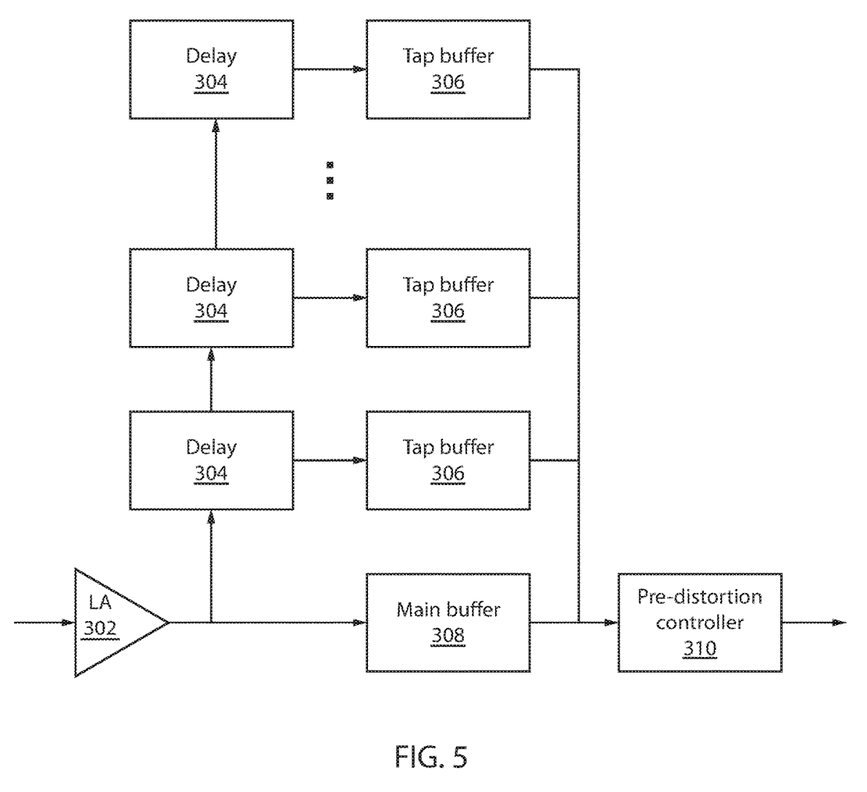
FIG. 5 is a diagram showing multi-tap equalization in accordance with the present principles.

Referring now to FIG. 5, an alternative embodiment of the driver 108 is shown. For more aggressive power settings, a simple single-tap FFE might not be adequate. The multi-tap FFE shown in FIG. 5 follows the structure of the single-tap FFE shown in FIG. 3, but includes additional feed-forward paths, each of which may be independently controlled according to the optimal pre-distortion.

Figure 6:
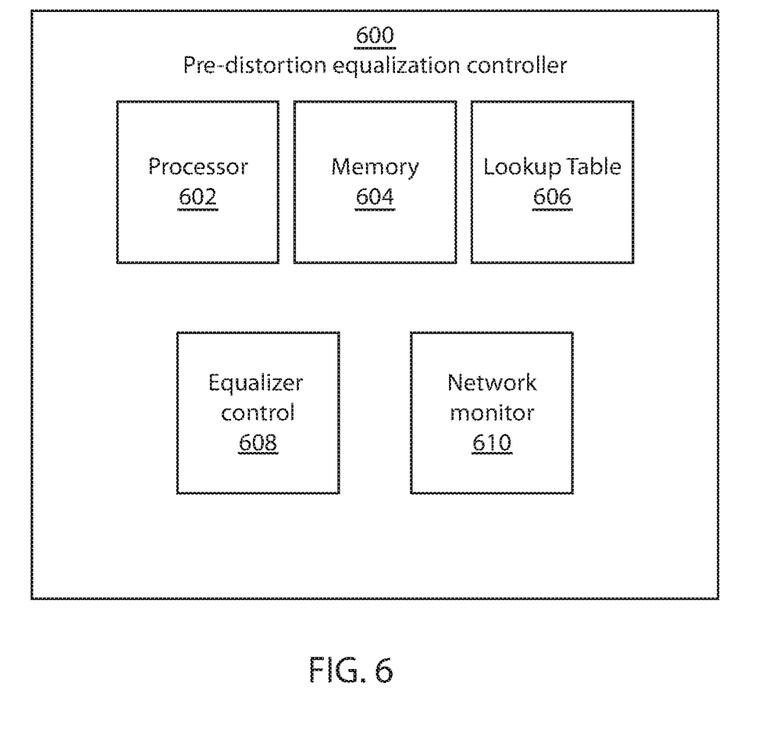
FIG. 6 is a block diagram of a pre-distortion equalization controller in accordance with the present principles.

Referring now to FIG. 6, a block diagram of a pre-distortion equalization controller 600 is shown. The controller 600 includes a processor 602 and a memory 604 that stores a lookup table 606 or recently modified values. The lookup table includes values for the taps and delays of the equalizer and main buffer, and these values are passed to the FFE buffers 306 and delays 304 via equalizer control 608. As shown in the present embodiments, the pre-distortion equalization controller 600 may be a separate component that controls block 310 to insert a pre-cursor pulse, or may be formed integrally with block 310 itself.

During operation, it can be advantageous to monitor the network performance and adapt the equalizer control 608 accordingly. A network monitor 610 receives information regarding network operation and performance and adjusts outputs to the FFE in accordance with that information. For example, one possible data-dependent control is a consecutive identical data counter. In an analog context, an alternative would be an analog circuit such as a capacitor that stores an amount of charge proportional to the duration of a sequence of ones or zeroes. If the incoming data includes a long stream of ones, the network monitor 610 can detect this using a counter and the bias and drive currents can be dynamically reduced to save average power consumption. If the incoming data includes a long stream of zeros, the bias current can be increased to help reduce the impending turn-on delay.

The network monitor 610 may also receive performance information from the receiver via backchannel communications. This link quality information may be sent via a low-speed link or other means, such as an out-of-band signal or through a service processor, and is used to optimize the transmitted signals. The specific information fed back will depend on the configuration of the receiver. Such information may include bit-error-rate (BER) and jitter. Some receivers incorporate the ability to sweep out the received eye opening in time and in voltage so that, in such a case, direct information regarding the eye opening itself can be conveyed.

Figure 7:
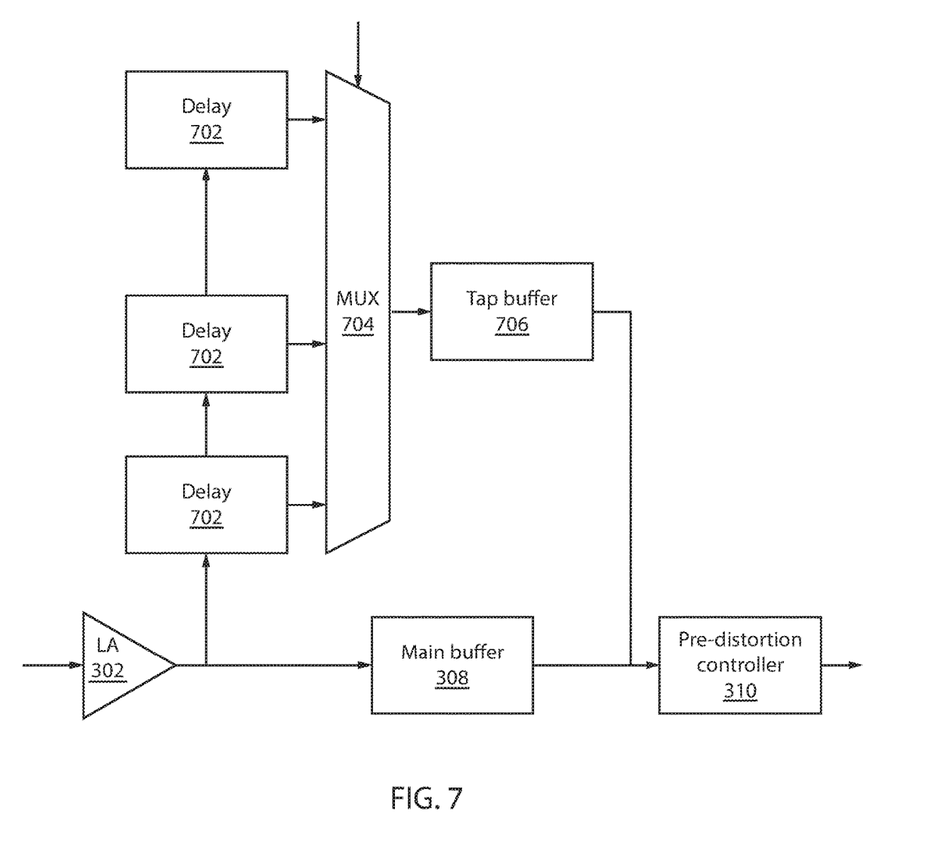
FIG. 7 is a diagram showing selectable multi-tap equalization in accordance with the present principles.

Referring now to FIG. 7, a further embodiment of a driver 108 is shown, with multiple feedforward signals being selected by a control signal from the controller 600. Rather than having multiple full taps, a set of constant delays 702 are used, each producing a signal having a different delay. The delayed signals are provided to a multiplexer 704 and one of the signals is collected based on information from the network monitor 610 to provide an optimal pre-distortion. The selected delay signal is provided to a tap buffer 706 and then combined with the signal from the main buffer 308 as described above.

In the present embodiments, the values for the tap buffers are called from a lookup table in accordance with a block of data to be transmitted. Pre-emphasis is therefore made responsive to the actual data to be transmitted. For example, as a run of consecutive zeros in a data stream increases, the duration of a pre-cursor pulse can be increased.

Figure 8:
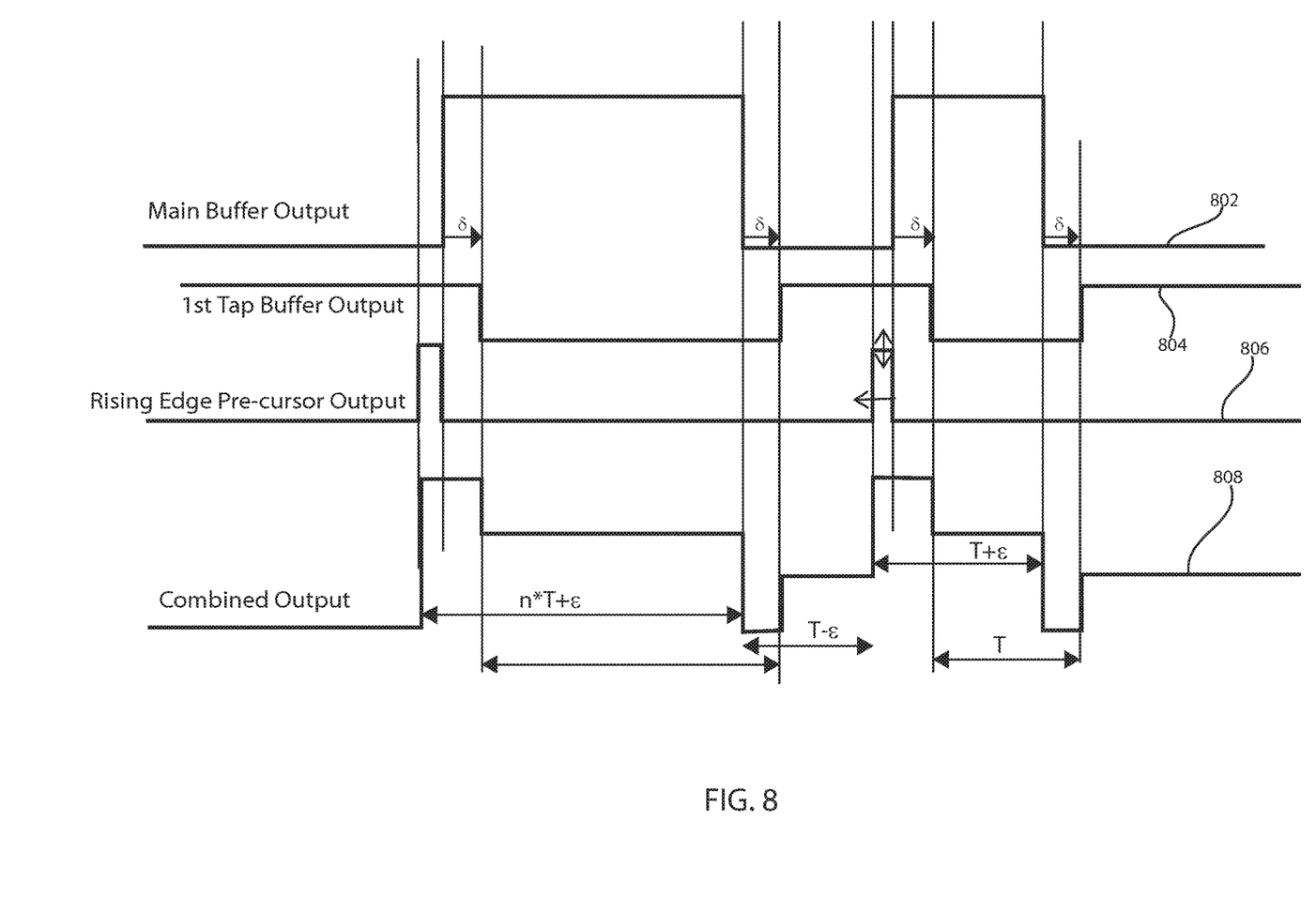
FIG. 8 is a diagram showing the combination of a signal with a delayed tap and a distorting pre-cursor in accordance with the present principles.

Referring now to FIG. 8, an illustration of the addition of a precursor signal is shown. The main buffer output 802 carries the raw data signal and is shown with the first tap buffer output 804 as described above. A delay of δ separates the main buffer signal 802 from the first tap buffer signal 804 and a single bit on the main buffer signal 802 has a duration of T seconds. A second additive signal, the rising edge precursor signal 806, is added to the rising edge only of the main buffer output signal 802. The duration of the precursor signal 806 is shown as ϵ and the amplitude and duration of the precursor signal 806 may be fixed or alternatively may be varied in accordance with the data content of the main buffer signal 802. The combined output signal 808 thus includes pre-cursor and post-cursor equalization, with additional pre-emphasis to accommodate for the turn-on jitter of the emitter 102.

The quantity ϵ, or a range for the same, is determined to first order by pre-characterization of the lasers during development or manufacturing. A good guess for ϵ is to set it equal to the anticipated turn-on delay $\tau_d$ with a $\tau_{th}$ value appropriate for the laser in use.

Figure 9:
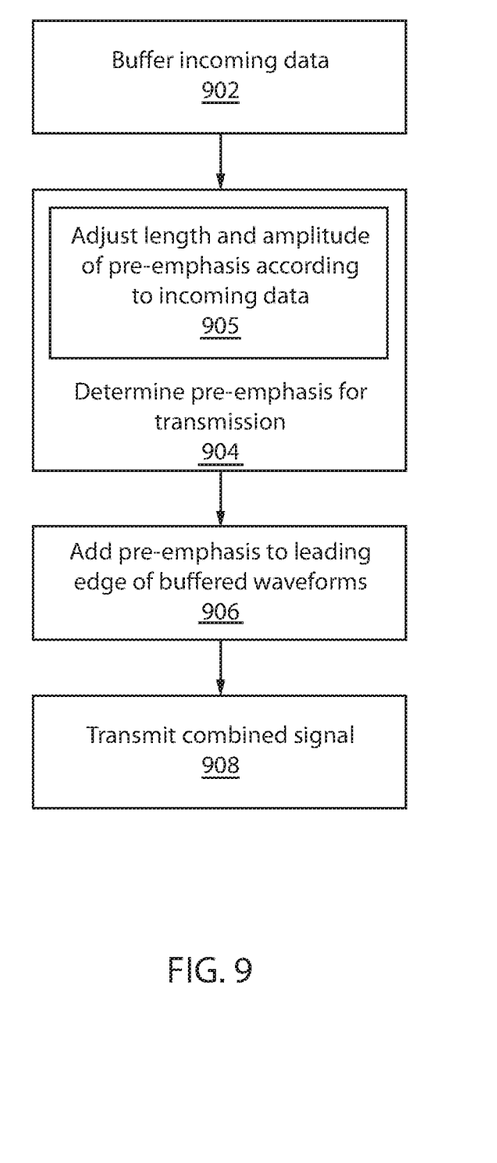
FIG. 9 is a block/flow diagram showing a method for transmitting a pre-emphasized signal in accordance with the present principles.

Referring now to FIG. 9, a method for transmission with pre-emphasis is shown. Block 902 receives and buffers incoming data. This data is considered herein as being simple binary data, but it should be recognized that other forms of modulation may be used, including amplitude modulation, phase shift keying, and others. Block 904 determines the best pre-emphasis sequence to use for the particular data that is awaiting transmission. This may be accomplished by looking up the sequence in a lookup table or by using combinational logic. Because low-power lookup table operations can be slower than a bit transmission rate, block 904 may perform a parallel lookup. In this case, the lookup table stores entire sequences of data and their corresponding pre-cursor patterns.

Part of determining the pre-emphasis is adjusting the length and amplitude of the pre-cursor pulses according to the specific data sequence in block 905. As noted above, this may include extending the duration of the pre-cursor pulse after a series of consecutive zero bits, because the emitter 102 will need additional time to turn on in such a case. Block 906 then adds the pre-emphasis signal to the leading edge of the buffered data waveforms. Notably this form of equalization is applied solely to the leading edge, in contrast to conventional forms of equalization which apply to the rising edge and falling edge equally. Block 908 then transmits the combined signal, which is received by the receiver in better condition than would be the case with an undistorted signal.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 10:
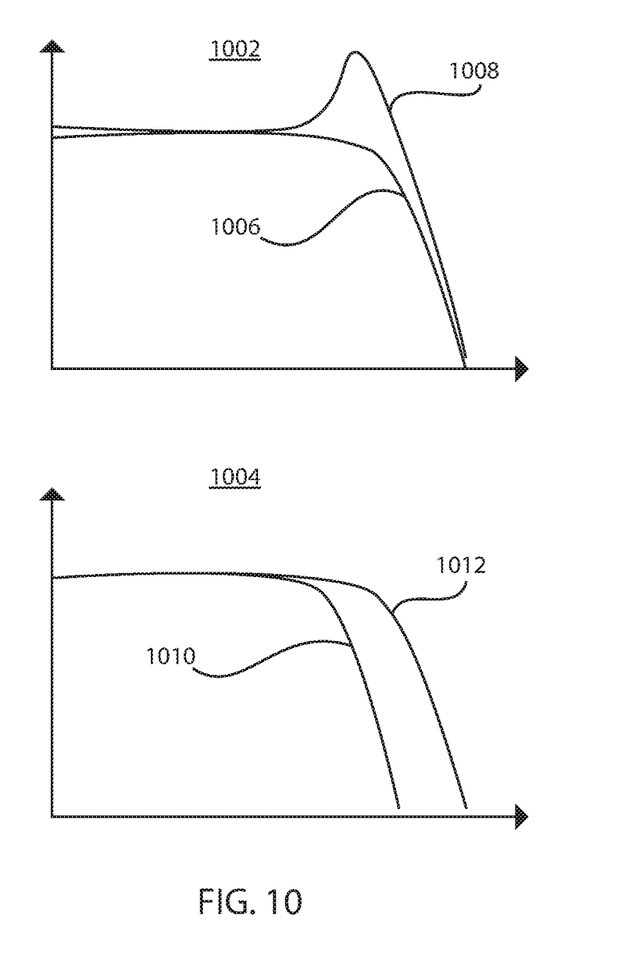
FIG. 10 is a diagram showing a comparison of transmitted and received signal frequency spectrums in accordance with the present principles.

Referring now to FIG. 10, a comparison of transmitter output frequency spectrum 1002 and receiver output frequency spectrum 1004 is shown for signals with pre-emphasis and signals without. The vertical axis shows response, measured in decibels, while the horizontal axis represents baseband frequency, measured in Hertz, and has an exemplary range from 0 Hz to 30 GHz. In the transmitter output graph, the undistorted transmitter signal 1006 is shown with the pre-distorted signal 1008. The figure shows a peak in response at the high end of the transmitter's frequency range. The result of this pre-distortion is that the receiver output 1004 for the pre-distorted signal response 1012 shows a much better response than the undistorted signal response 1010.

Having described preferred embodiments of a system and method for near-threshold optical transmitter pre-distortion (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims.

The invention claimed is:
1. A method for low-power transmission, comprising:
biasing an emitter in a non-linear operating range of the emitter near a threshold current of the emitter;
distorting a data signal to add a precursor pulse to a rising edge of a data waveform to quickly bring the emitter into a linear operating range by applying the precursor pulse having an amplitude that is responsive to preceding bits, said amplitude being higher if there are multiple preceding zeroes than if there is only one preceding zero; and
transmitting the distorted data signal at the emitter.

2. The method of claim 1, wherein the emitter comprises a semiconductor laser.

3. The method of claim 2, wherein biasing the emitter comprises applying a biasing voltage or current below the threshold current of the semiconductor laser.

4. The method of claim 2, wherein the semiconductor laser comprises a vertical-cavity surface-emitting laser.

5. The method of claim 1, further comprising delaying a copy of the data signal and applying the delayed copy to the distorted data signal.

6. The method of claim 1, wherein distorting the data signal comprises obtaining a pre-cursor pulse sequence that corresponds to a bit sequence carried by the data signal from a lookup table.

7. The method of claim 6, wherein distorting the data signal comprises obtaining the pre-cursor pulse sequence for a plurality of bits in parallel using a single lookup table read operation.

8. A non-transitory computer readable storage medium comprising a computer readable program, wherein the computer readable program when executed on a computer causes the computer to perform the steps of claim 1.

9. The method of claim 1, further comprising counting consecutive identical data bits in the data signal.

10. The method of claim 1, further comprising monitoring the data signal to dynamically adjust the distortion for power conservation.

11. A transmitter, comprising:
an emitter having a threshold current, configured to transmit a pre-distorted data signal, wherein the emitter is biased in a non-linear operating range near the threshold current; and
a pre-distortion equalization controller configured to distort a data signal to add a precursor pulse to a rising edge of a data waveform to quickly bring the emitter into a linear operating range with the precursor pulse having an amplitude that is responsive to preceding bits, said amplitude being higher if there are multiple preceding zeroes than if there is only one preceding zero.

12. The transmitter of claim 11, wherein the emitter comprises a semiconductor laser.

13. The transmitter of claim 12, wherein the pre-distortion equalization controller is configured to apply a biasing voltage or current below the threshold current of the semiconductor laser.

14. The transmitter of claim 12, wherein the semiconductor laser comprises a vertical-cavity surface-emitting laser.

15. The transmitter of claim 11, wherein the pre-distortion equalization controller is configured to delay a copy of the data signal and applying the delayed copy to the distorted data signal.

16. The transmitter of claim 11, wherein the pre-distortion equalization controller comprises a lookup table configured to provide a pre-cursor pulse sequence that corresponds to a bit sequence carried by the data signal.

17. The transmitter of claim 16, wherein the pre-distortion equalization controller is configured to obtain the pre-cursor pulse sequence for a plurality of bits in parallel using a single lookup table read operation.

18. The method of claim 11, further comprising counting consecutive identical data bits in the pre-distorted data signal.

19. The method of claim 11, further comprising monitoring the data signal to dynamically adjust the distortion for power conservation.

20. A method for low-power transmission, comprising:
   biasing an emitter in a non-linear operating range of the emitter near a threshold current of the emitter;
   distorting a data signal to add a precursor pulse to a rising edge of a data waveform to quickly bring the emitter into a linear operating range by obtaining a pre-cursor pulse sequence that corresponds to a bit sequence carried by the data signal from a lookup table, said lookup table including values for taps and delays of an equalizer and a main buffer; and
   transmitting the distorted data signal at the emitter.

* * * * *